United States Patent [19]
McMurtry et al.

[11] Patent Number: 5,345,689
[45] Date of Patent: Sep. 13, 1994

[54] MEASURING PROBE

[75] Inventors: David R. McMurtry, Wotton-Under-Edge; David A. Wright, Edinburgh; Stephen E. Lummes, Stroud, all of United Kingdom

[73] Assignee: Renishaw Metrology Limited, Gloucestershire, United Kingdom

[21] Appl. No.: 977,437
[22] PCT Filed: May 22, 1992
[86] PCT No.: PCT/GB92/00932
  § 371 Date: Feb. 25, 1993
  § 102(e) Date: Feb. 25, 1993
[87] PCT Pub. No.: WO92/21932
  PCT Pub. Date: Dec. 10, 1992

[30] Foreign Application Priority Data

May 25, 1991 [GB] United Kingdom ............... 9111382.9

[51] Int. Cl.⁵ .......................... G01B 11/00; G01B 5/00
[52] U.S. Cl. .......................................... 33/559; 33/556
[58] Field of Search ................. 33/559, 1 M, 503, 504, 33/556

[56] References Cited

U.S. PATENT DOCUMENTS

| | | | |
|---|---|---|---|
| 4,530,159 | 7/1985 | Ernst | 33/503 |
| 4,532,713 | 8/1985 | Feichtinger | 33/559 |
| 4,941,266 | 7/1990 | Bissegger et al. | 33/559 |
| 5,146,691 | 9/1992 | McMurtry | 33/559 |
| 5,209,131 | 5/1993 | Baxter | 33/559 |

FOREIGN PATENT DOCUMENTS

| | | |
|---|---|---|
| 0426492 | 5/1991 | European Pat. Off. |
| 8222757.8 | 12/1986 | Fed. Rep. of Germany |
| 3740657 | 6/1989 | Fed. Rep. of Germany |

*Primary Examiner*—Christopher W. Fulton
*Attorney, Agent, or Firm*—Oliff & Berridge

[57] ABSTRACT

A measuring probe comprises a stylus-carrying member on which a stylus is magnetically retained. The carrying member is supported on a flat diaphragm spring for tilting movement relative to an intermediate member. The intermediate member is supported on two further diaphragms for linear movement relative to a housing. The spring rates of diaphragm and further diaphragms are chosen to give the probe the desired relative force/-displacement characteristics in X,Y and Z.

13 Claims, 5 Drawing Sheets

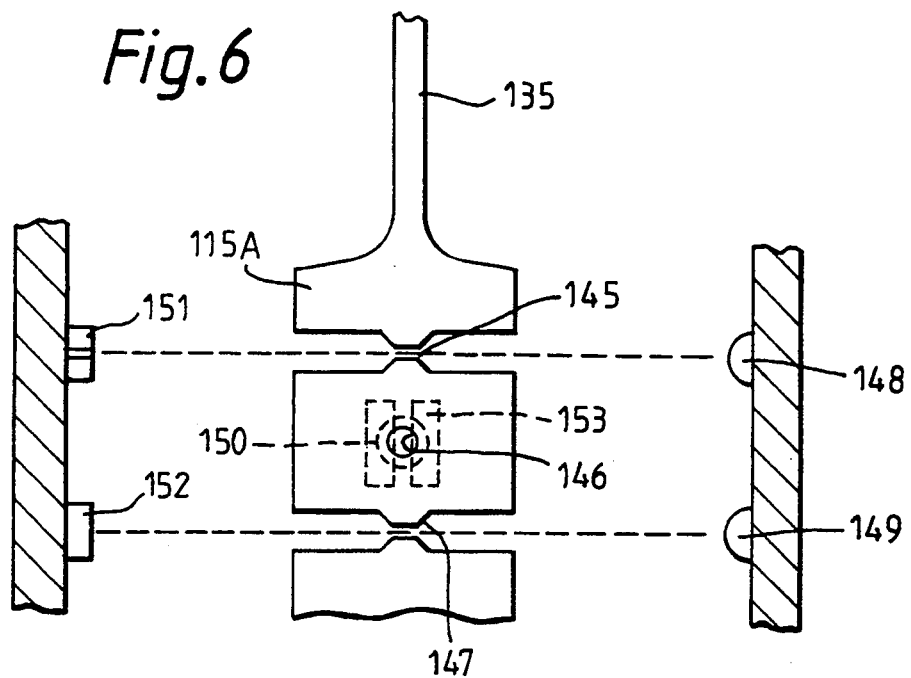
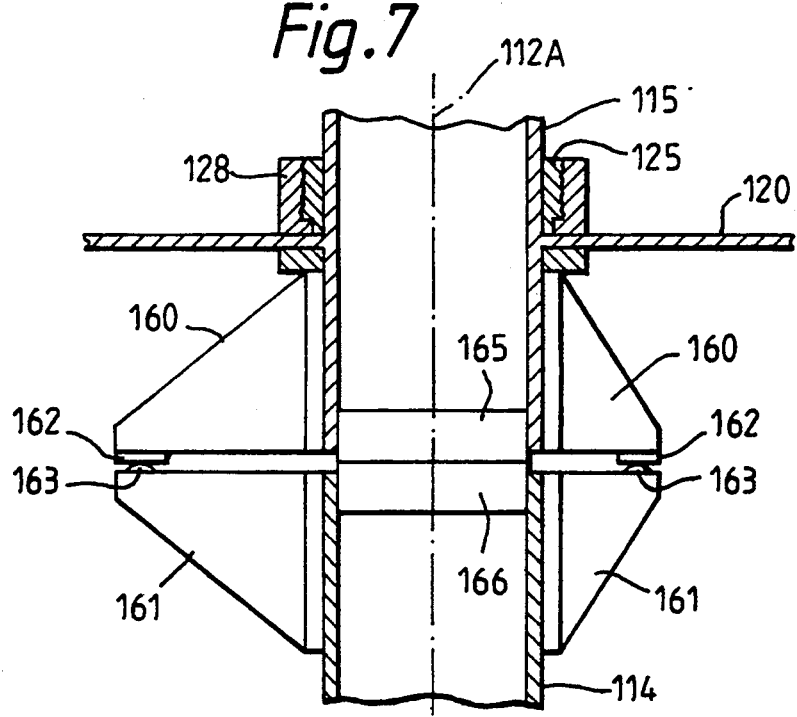

MEASURING PROBE

BACKGROUND TO THE INVENTION

1. Field of the Invention

The present invention relates to a measuring probe, and relates in particular to a probe having the capability of measuring the deflection of a stylus assembly from a zero or rest position defined by a resilient planar support. Probes of this type may be used for scanning the surface of a workpiece to determine its shape.

2. Description of Related Art

Such a probe is known, for example, from UK Patent Specification No. 1,573,447. This specification describes a probe in which a stylus assembly, which has a work-contacting stylus attached thereto, is supported in the rest or zero position (i.e. the position in which no external load is applied to the stylus) by a planar spring. Probes of this type have few moving parts and therefore have the advantage of being relatively cheap to manufacture.

However, these probes suffer from a problem in that the force required to produce a given deflection of the stylus from the rest position in the direction of its longitudinal axis, (hereinafter referred to as the Z axis of the probe), and the force required to produce the same magnitude of deflection in the sense of tilting the stylus relative to the Z axis are interdependent. That is to say, that any modification to the probe which alters the spring rate in respect of one of these motions, will also affect the rate in respect of the other.

For example, in the above described probe design, it is usually the case that the spring rate in the Z direction is greater than the spring rate in the sense of tilting of the stylus.

This gives rise to a problem when the probe is used as an analogue probe for scanning a workpiece surface, where the stylus is in continuous contact therewith, in that, when the stylus tip meets a change in the inclination of the surface which increases the pressure on the stylus in the Z axis, the stylus may slide sideways on the surface due to the lesser force restraining tilting thereof instead of remaining in the desired plane.

In many scanning operations the machine control system works on the basis of calculating from the probe outputs of X, Y and Z deflections, the vector which is normal to the surface, and then driving the probe in a direction normal to the calculated vector. Thus, where the probe readings are giving a false indication of the surface inclination, (due to sideways sliding of the stylus) the control will drive the probe in the wrong direction and this can slow down the scanning process.

SUMMARY OF THE INVENTION

The present invention seeks to ameliorate these problems by providing a measuring probe of the above mentioned type in which these two forces may be adjusted independently.

According to the present invention a measuring probe comprises:

a fixed structure by which the probe may be connected to a movable arm of the machine;

an intermediate member;

supporting means for supporting the intermediate member for linear motion along an axis;

means for applying a biasing force to said intermediate member when said intermediate member is displaced from a rest position along said axis, said biasing force acting to return said intermediate member to said rest position;

a diaphragm provided on said intermediate member, and extending in a plane orthogonal to said axis; and a stylus carrying member for supporting a workpiece contacting stylus connected to said diaphragm to enable tilting movement of said carrying member, and thus of said stylus relative to said axis.

Preferably, the supporting means are provided by a pair of further diaphragms whose combined spring rate in the direction of said axis may, for example, be chosen so that it is equal, for a predetermined length of stylus, to the force-displacement characteristic in respect of tilting of said stylus-carrying member (and thus said stylus). The force required to produce a given magnitude of deflection in the sense of tilting of the stylus and in the sense of longitudinal deflection thereof will thus be the same.

An independent aspect of the present invention relates to a transducer arrangement which may be used in conjunction with the probe described above. According to a second aspect of the present invention there is provided a transducer assembly comprising: a light source provided on the fixed structure for generating a beam of light; a photodetector provided on the fixed structure in register with the light beam; a shutter, coupled to the stylus-carrying member for movement corresponding to movement of the stylus-carrying member, and positioned between the light source and the photodetector, the shutter having an aperture which permits the passage of a fraction of said light beam onto the surface of the photodetector; wherein said photodetector emits at least one signal which is indicative of the displacement in a given direction of the position of incidence of said fraction of said light beam on said detector.

Embodiments of the present invention will now be described, by way of example, and with reference to the accompanying drawings in which:

FIG. 6 is a detail of FIG. 5;

FIG. 7 is a cross-section of a modification to the probe of FIG. 5; and

Figure 1:
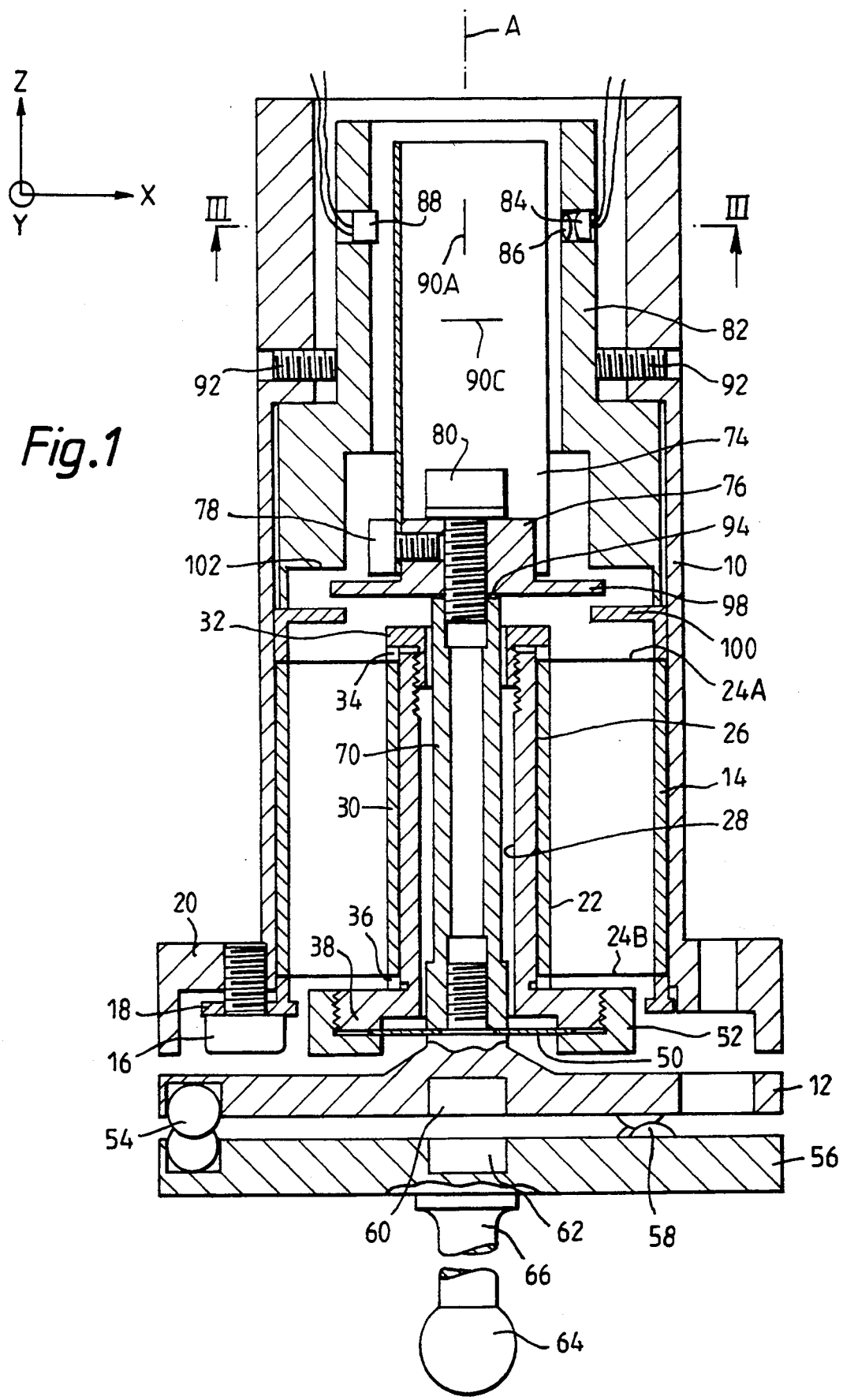
FIG. 1 is a cross-section through a first embodiment of a probe according to the present invention.

Referring now to FIG. 1, a measuring probe has a fixed structure provided by a cylindrical housing 10 relative to which a stylus retaining member 12 is supported by a mechanism permitting three-dimensional movement thereof relative to the housing 10. The suspension mechanism is carried inside a sleeve 14 which is connected to the housing 10 via three bolts 16 which project through three flanges 18 at the base of the sleeve 14, and form a screw-threaded engagement with an outwardly depending annular flange 20 at the base of the housing 10. The suspension mechanism comprises a cylindrical intermediate member 22 supported by two resilient diaphragms 24A,B which are also connected to the sleeve 14. The intermediate member 22 includes an inner hollow cylindrical member 26, defining a bore 28 through its center, and an outer cylindrical member 30. The diaphragms 24A,B are connected to the intermediate member 22 by a locking nut 32, having a screw-threaded engagement with the bore 28. The nut 32 bears against a spacer 34 to compress the upper diaphragm 24A between the spacer 34 and the outer member 30, and the lower diaphragm 24B between the outer cylindrical member 30 and a further spacer 36, which in turn bears against an outwardly depending annular flange 38 provided at the base of the inner member 26. The intermediate member 22 is thus supported on the diaphragms for movement along an axis A relative to the housing 10; the diaphragms 24A,B however restrict any rotational movement about any axis perpendicular to the axis A.

Figure 2:
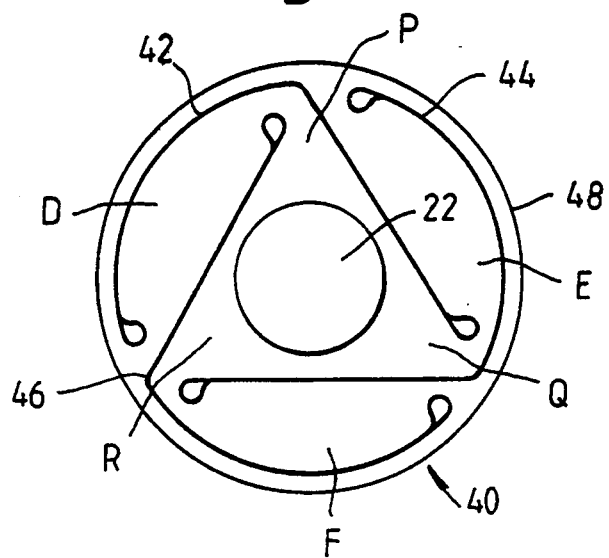
FIG. 2 is a detail of FIG. 1.

Desirably, the diaphragms 24A,B should have a relatively low force-displacement characteristic in the direction of movement of the intermediate member along the axis A. One example of a design of diaphragm which achieves this is shown in FIG. 2 and comprises a circular sheet of material 40 in which are formed three slits 42,44,46, to leave essentially a three-legged core through which the intermediate member 22 extends. Three legs denoted P,Q,R are connected respectively to a continuous annular periphery 48 by three tangential struts D,E, and F. While the diaphragms 24A,B constrain any lateral movements or rotations of the intermediate member 22 in the plane of the diaphragm, displacement of the intermediate member along the Z axis will result in some rotation of the intermediate member 22 relative to the housing 10.

Referring again to FIG. 1, the stylus carrying member 12 is supported relative to the intermediate member on a further diaphragm 50 which is clamped between a lower locking nut 52 and the outwardly depending flange 38. The further diaphragm 50 is preferably relatively stiff to deflections of the stylus carrying member 12 relative to the intermediate member 22 in the direction of the axis A. However, the further diaphragm 50 permits relatively easy movement of the carrying member 12 relative to the intermediate member 22 in the sense of tilting relative to the axis A. To this end, the further diaphragm 50 is preferably a simple circular flat diaphragm spring having no slits or other modifications.

The carrying member 12 supports three balls 54, which project from its lower surface. The balls 54 serve to locate a stylus-carrying plate 56 on the member 12 by engagement of each of the balls 54 in the convergent surfaces provided by adjacently situated pairs of further balls 58 provided in the upper surface of the plate 56. The plate 56 is retained in engagement with the member 12 by magnets 60,62 provided on the member 12 and the plate 56 respectively. This form of kinematic engagement between the plate 56 and the member 12 serves several functions: firstly, it enables the plate 56 to be removed from the engagement with the member 12, and subsequently replaced without the need to re-datum the probe to determine the position of the sensing tip 64 of the stylus 66 supported on the plate 56; and secondly this engagement provides a useful crash protection feature, in that when the lateral force on the stylus increases to such an extent that damage to the suspension mechanism may occur, the plate 56 will simply fall away from engagement with the member 12. The force required to achieve this is dependent upon the force between the magnets 60 and 62 which are thus chosen accordingly.

Figure 3:
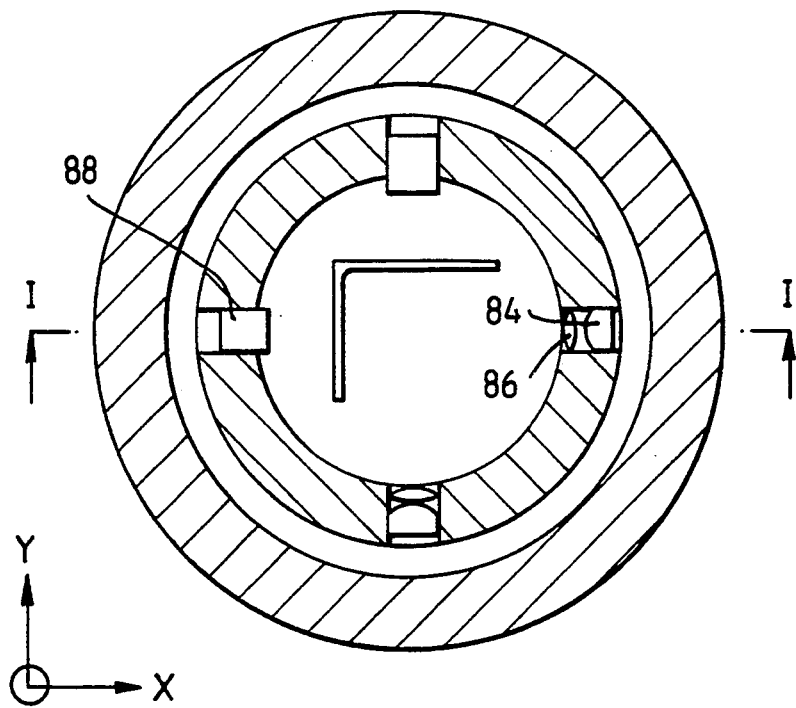
FIG. 3 is a cross-section on the line III—III of FIG. 1.

The carrying member 12 further comprises an elongate stem 70 which extends along, and projects beyond the inside of the bore 28 of the intermediate member 22. The free end of the stem 70 thus projects beyond the space enclosed by the diaphragms 24A,B. The stem 70 carries, at its free end, a transducer member in the form of a shutter 74 having an L-shaped cross-section (see also FIG. 3). The shutter 74 is supported on a block 76 by a bolt 78; the block 76 is connected to the carrying stem 70 by screw-threaded engagement of a bolt 80 with the inside of the carrying member 70. The transducer member 74 is fixedly connected to the stylus-carrying member 12 for tilting movement therewith relative to the axis A, and longitudinal movement along the axis A. Movement of the transducer member 74 relative to the housing 10 is thus exactly proportional to the corresponding movement of the sensing tip 64 of the stylus 66 relative to the housing 10.

Figure 4A:
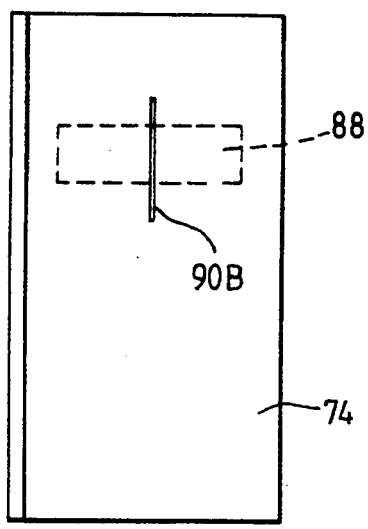
FIGS. 4a and 4b are a further detail of FIGS. 1 and 3.
Figure 4B:
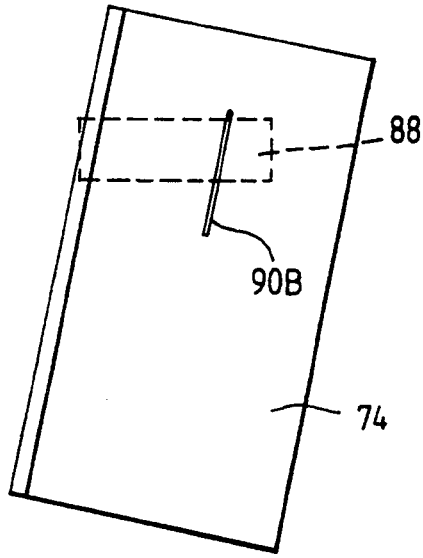

The magnitude of movement of the transducer member 74 in directions illustrated in FIG. 1 and X,Y,Z is detected by three sensors which are retained inside a transducer housing 82. Each sensor includes an LED 84 and associated collimating lens 86 which together generate a beam of light. A position-sensitive photodetector 88 is provided in register with this beam of light in the opposite side of the housing 82. The transducer member 74 comprises three apertures in the form of three elongate slits 90A,B,C, which lie in register with the light beam of the associated sensor. The slits 90A,B,C permit the passage of a fraction of the beam from the diode 84 onto the surface of the position-sensitive detector 88; tilting of the stylus 64, and thus of the transducer member 74, in, for example, the Y direction causes the slit 90B (see FIGS. 4a and 4b) to move relative to the position-sensitive detector 88. The slit 90B remains within the light beam during this tilting movement, however the displacement on the surface of the detector 88 in the Y direction of the fraction of light which passes through the slit 90B has changed by virtue of movement of the slit. The output of the position-sensitive detector 88 will thus change correspondingly, indicating a displacement of the stylus tip 64 in the Y direction. Identical transducing arrangements for movement of the transducer member 74 in the X and Z directions are provided by the slits 90A,C and the associated emitters and detectors.

In order to position each slit 90A,B,C such that the fraction of light incident upon the associated detector is in the middle of the detector's range when the stylus-carrying member 12 lies at its rest position with respect to the housing, the transducer housing 82 is adjustable in the X and Y directions relative to the housing 10 by four adjusting screws 92. Adjustment of the height of the transducing member 74 with respect to the transducer housing 82 is provided by a number of shims 94 situated between the carrying block 76 and the upper end of the carrying stem 70.

The extent of tilting movement of the stylus-carrying member relative to the housing 10 is limited by the clearance between the carrying stem 70 and the bore 28. Thus, the lock nut 32 provides a stop for tilting movement of the carrying stem 70 in the X and Y directions relative to the housing 10. A flange 98 provided on the supporting block 76 is movable in the Z direction between limits defined by inwardly depending flange 100 on the sleeve 14, and a lower lip 102 in the transducer housing 82.

With this construction of the probe, the spring rate in the sense of tilting of the carrying member 12 relative to the axis A in the X and Y directions is dependent completely upon the spring rate of the further diaphragm 50 and the length of the stylus 66, whereas the spring rate in the sense of displacements of the stylus-carrying member 12 in a longitudinal direction along the direction of the axis A (i.e. the Z direction) is determined exclusively by the combined spring rate of the diaphragms 24A,B. Thus, the spring rate in respect of tilting of the stylus-carrying member 12 is completely independent of the spring rate in respect of longitudinal displacement of the carrying member 12. For a given length of stylus therefore, it is possible to choose the spring rate of the diaphragms 24A,B such that the force on the sensing tip 64 will be equal for deflections in the X,Y and Z directions. Nota Bene While the actual spring rate of the further diaphragm 50 does not change when the length of the stylus 66 changes, a change in the length of the stylus changes the moment on the diaphragm 50 and thus the force required to produce a given deflection of the stylus tip 64; this is thus equivalent to a change of the spring rate.

A further important aspect of the present invention lies in the relationship between the sensors in the transducer housing 82 and the transducer member 74. The sensors in respect of each aperture 90A,B,C are stationary with respect to the housing 10. Each sensor thus transduces movement of the transducer member 74 in the respective direction relative directly to the housing. Cumulative errors due to mounting of sensors on moving parts of the probe is thus avoided. Also, because each of the slits 90A,B,C extends transversely to the direction in which the associated transducer measures, displacement of the transducer member in a direction perpendicular to the measuring direction is permitted without any loss of signal.

A second embodiment of the invention will now be described with reference to FIG. 5, in which a probe has an external housing 110, within which is mounted a cylindrical stylus assembly 112, having a longitudinal axis 112A, and which includes a stylus 114 connected to a cylindrical body 115 by means of a screw-threaded connection 116. The stylus 114 projects from the housing 110 and terminates in a work-contacting ball tip 118.

The support for the stylus assembly is in two parts. A first resilient support, in this example a resilient planar spring diaphragm 120, is clamped at its periphery to the housing 110 by means of clamping rings 121 and 122 which are screwed together by screws 123. One end of the cylindrical body 115 is connected to the planar spring at its center by a further clamping arrangement, including an externally screw-threaded ring 125 having a shoulder 126 and which is bonded, for example by glue, to the body 115. The diaphragm 120 has a central aperture 127 which allows the body 115 to pass therethrough, but which is of lesser diameter than the shoulder so that the spring rests on the shoulder. A second, clamping ring 128, which is internally screw-threaded, is screwed onto ring 125 to clamp the spring onto the shoulder 126.

This first support allows tilting movement of the stylus assembly 112, and hence the stylus, about the plane of the diaphragm 120 when the stylus tip 118 is acted upon by forces in the X and Y axes directions. Additionally the first support allows movement of the stylus assembly 112 linearly in the direction of the longitudinal axis 112A of the assembly when the stylus is acted upon by a force in the Z direction. However, the design of the diaphragm 120 is such that lateral movements of the stylus assembly in the plane of the diaphragm are constrained, as are rotations about the Z axis while the diaphragm 120 remains in its plane.

The second support which is introduced in accordance with the invention is shown, in this example, to be a second resilient planar diaphragm 130. The diaphragm 130 is clamped to the housing 110 between clamping rings 131 and 132 by screws 133. Ring 131 forms part of an end cap 134 of the probe, while ring 132 is itself bonded to the housing, or screwed thereto by screws not shown.

The free end 119 of the stylus assembly (i.e. the end opposite to the stylus 114) is connected to the center of the diaphragm by means which allows for transverse movement of said end, which in this example is a wire 135.

The wire is formed as a reduced diameter portion of a rod which is fitted at one of its ends into the free end 119 of the cylindrical body 115. The rod thus forms a plug 115A which is used as part of an optical transducing system (see FIG. 6).

At its other end the rod is connected to the central portion of the diaphragm 130 by a clamping arrangement which includes a shoulder 136 on the rod and a spacer 137 which passes through the end cap 134. The diaphragm 130 is clamped between the shoulder 136 and the spacer 137 by a screw 138 and washer 139. The arrangement is such that although the diaphragm 130 is tightly clamped by the spacer, the spacer provides a clearance 140 between the end cap and the washer 139. The clearance 140 allows for the axial movement of the stylus assembly, but the washer 139 provides an end stop to limit the axial movement to prevent overstraining of the resilient supports in the event of an excessive force being applied to the stylus 114.

The diaphragm 130 will provide resistance to movement of the stylus in the Z direction in addition to that provided by the first diaphragm 120. Similarly the combination of the wire 135 and the second diaphragm 130 will provide resistance to deflection of the stylus in the X and Y directions which is in addition to that provided by the first diaphragm 120. Thus for at least one stylus length, it is possible to design the combination of the two diaphragms 120 and 130 and the wire 135, to ensure that the same deflection of the stylus tip 118 in the X, Y or Z directions will result from the application of a given force irrespective of the direction in which the force is applied to the stylus.

The design of the diaphragms is as illustrated in FIG. 2. An alternative diaphragm design which allows for X, Y tilting and Z axis displacement of the stylus assembly but which prevents rotation of the stylus about its axis is shown in UK Patent Specification No. 1,573,477.

FIG. 6 shows the detail of the transducing system. Apertures 145,146 and 147 are made through the plug 115A, which is the part of the stylus assembly furthest from the planar spring 120 to enable the maximum X and Y deflections to be sensed. Light sources 148,149 and 150 (preferably LED) are provided on the housing 110 at the same height as the apertures, so that, in operation, the light beams from the sources pass through the apertures to fall onto split photo-diode detectors 151,152 and 153 on the housing opposite to the LEDs. The detectors produce electrical signals in dependence upon the amount of light falling on each half of the detector, and by using the arrangement described below, the signals can be made to indicate the magnitude of the X, Y and Z deflections of the stylus assembly.

The three detectors have their splits oriented so that only one detector will detect deflection of the stylus in any of the three directions X, Y and Z. Thus, for example, LED 148 shines through an aperture 145 onto a split detector 151 which has a split lying in the X,Y plane and detects primarily Z axis movements of the stylus assembly. Similarly LED 149 projects a beam through an aperture 147 onto a split detector 152 which has a split lying in the X,Z plane and detects primarily Y axis movements of the stylus assembly, while LED 150 shines through an aperture 146 in the stylus assembly, which lies at right angles to apertures 145 and 147, onto a split detector 153 which has a split lying in the Y,Z plane, and detects primarily X axis movements of the stylus assembly.

As with the previous embodiment, the tilting of the stylus will give rise to second order movements of the apertures in the stylus in the Z direction in addition to the X, or Y movements but these are so small as to be negligible.

In an alternative embodiment of the invention the second diaphragm 130 and wire 135 are replaced by three or more additional coil springs, which extend transversely between the free end of the stylus assembly 115 and the housing 110 may be provided in place of the second diaphragm 130 and wire 135.

Thus, when the stylus 114 is acted upon by forces in the X and Y directions and tilts about diaphragm 120, one or more of the coil springs will undergo a change in length which will provide an additional resistance to such tilting motion. However, when the stylus is acted upon by a purely axial force in the Z direction the springs will bend and/or pivot about their anchor points and will add a significantly smaller resistance to axial deflection of the stylus.

Hence, for example, by careful design of the combination of the diaphragm 120 and the coil springs, the deflection of the stylus tip in the X, Y or Z directions for any given combination of forces can be more nearly equalised.

Figure 5:
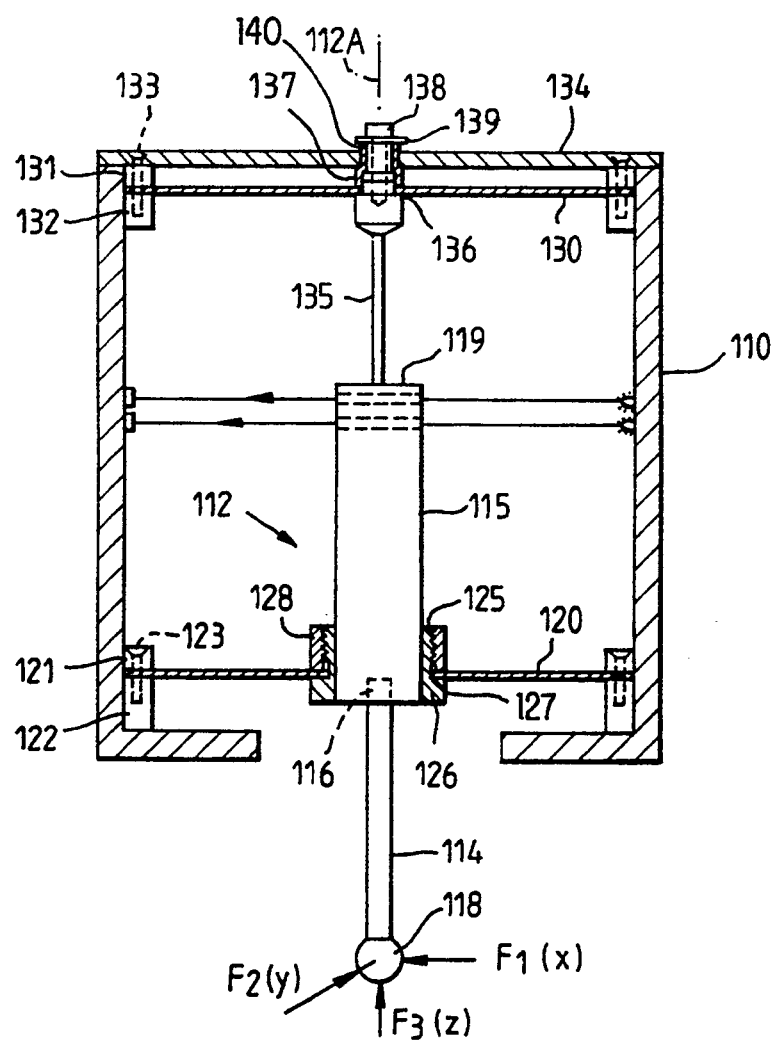
FIG. 5 is a cross-section through a second embodiment of a probe according to the present invention.

In the embodiment of FIG. 5 the stylus has been described as being screwed into the stylus assembly, but in an alternative design it may be magnetically clamped to the remainder of the stylus assembly so that it may be easily and quickly changed for another stylus suitable for a different scanning operation. Also, as mentioned earlier, such a magnetic clamping arrangement provides crash protection, preventing damage to the diaphragms in the event of excessive force on the stylus.

An example of such a construction is shown in FIG. 7. Parts similar to those illustrated in FIG. 5 are given the same reference numerals. The body 115 is provided with three equally spaced, radially extending ribs 160 at its end, and the stylus 114 is provided with similar ribs 161 at its end. Each of the ribs 160 is provided with a cylindrical roller 162 at the radially outer extremity of its end surface, and each of the ribs 161 is provided with a pair of balls 163 at the radially outer extremity of its end surface. The balls and rollers provide a kinematic seating arrangement for the stylus on the body 115.

A pair of confronting magnets 165,166 are provided respectively on the body 115 and the stylus 114 which hold the stylus in position under normal applications of force to the stylus. When an excessive tilting force is applied to the stylus the magnetic connection will break allowing the stylus to fall off before any damage can occur to the resilient supports.

Figure 8:
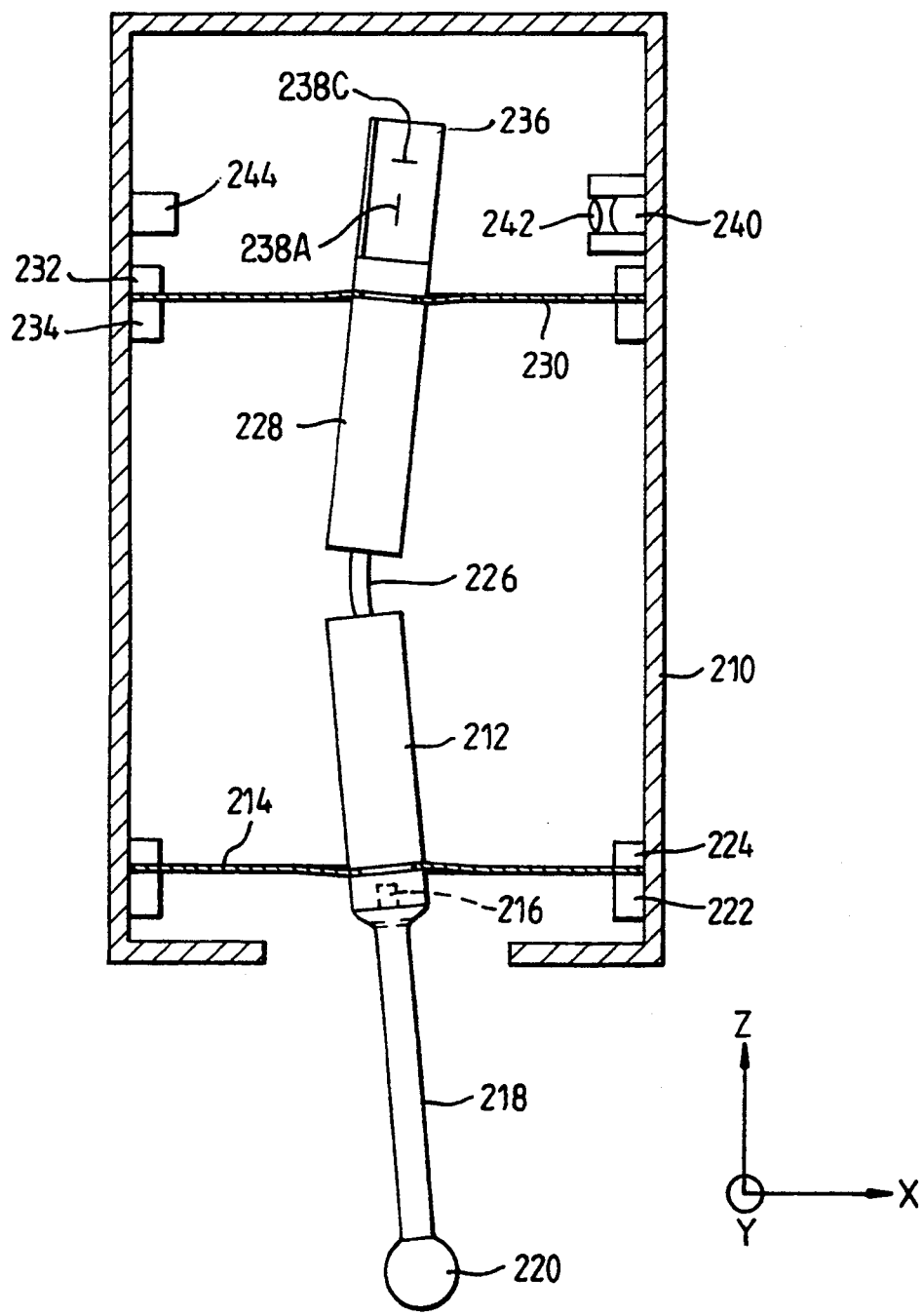
FIG. 8 is a cross-section of a third embodiment of a probe according to the present invention.

A further embodiment of probe will now be described with reference to FIG. 8. The probe comprises a fixed structure in the form of a cylindrical housing 210, by which the probe may be supported on the movable arm of a coordinate positioning machine on which it is to be used. A stylus carrying member 212 is supported on a first diaphragm 214, and is connected, via screw-threaded engagement 216 to a stylus 218 having a spherical sensing tip 220. The diaphragm 214 is clamped to the cylindrical housing 210 between two clamping rings 222,224 which are urged together by bolts (not shown). The diaphragm 214 permits tilting movements of the stylus-carrying member 212 and stylus 218 in the X and Y directions, together with longitudinal movement of the stylus-carrying member 212 in the Z direction. The stylus-carrying member 212 is coupled, via a short rod spring 226 to a transmission member 228, which is in turn supported on a further diaphragm 230. The further diaphragm 230 is rigidly clamped to the housing 210 between clamping rings 232,234, which are urged together by bolts (not shown). The further diaphragm 230 permits tilting movement of the transmission member 228 in the X and Y directions and longitudinal movement of the member 228 in the Z direction.

The transducing system for measuring the magnitude and direction of deflections of the stylus tip 220 from a nominal rest position is identical to the system used in the first embodiment of the present application. Briefly, the system comprises an L-sectioned transducer member 236 supported directly on the transmission member 228, and extending above the further diaphragm 230. As before, the transducer member 236 includes three slits, two of which are illustrated here under the designations 238A,238C. Sensors associated with each slit comprise an LED 240 and associated collimating lens 242 which generate a beam of light; a position-sensitive photodetector 244, also supported on the housing is positioned in register with the beam of light. Movement of the transducer member causes movement of the slits within the boundaries of the respective beams, causing corresponding movement of the fraction of the beam transmitted by the slit across the surface of the photodetector 244, which thus results in a change in the output of the photodetector indicative of the position of transducer member 236 and thus the stylus tip 220.

The rod spring 226 serves to provide additional resistance to tilting movement in the X and Y directions of the stylus-carrying member 212, thereby increasing the force required to tilt the carrying member 212 and thus the stylus 218. By selecting the stiffness of the rod spring 226 in accordance with a predetermined given length of stylus 218, the forces required to deflect the stylus 218 in the X,Y and Z directions can be equalised. The rod spring 226 should be as short as possible so that the deflection of the stylus tip 220 always corresponds to deflections of the transducer member 236 at high frequencies of movement; this ensures that the movement of the transducer member remains in phase with movement of the stylus.

Probes made in accordance with the invention as described above have a relatively small range of stylus deflections. These can be accurately recorded by the optical sensing system and thus the probe lends itself to use with a fast acting servo system (e.g. one with an update period at least as short as 1 millisecond) to produce a scanning system which is fast, accurate and relatively inexpensive.

In a modification of the probes shown in FIGS. 1 and 5, the pairs of diaphragms 24A,B and 120,130 may be used mainly for stylus guidance, with a separate axial spring being provided to supply the greater part of the axial force for restoring the stylus to its rest position. This is another method of adjusting the spring rate in the axial (Z) direction.

The relative spring rates for deflections of the stylus assembly in the Z, and X,Y directions are chosen in accordance with inter alia the algorithm used to control movement of the machine on which the probe is employed. It can be seen in the embodiments described in FIGS. 1, 5 and 8, that no separate axial spring is used. In these examples if the axial restoring force provided by the diaphragms is relatively small within the permitted range of movement of the stylus in the Z direction then with a lightweight hollow stylus assembly this will give a fast dynamic response to the probe in the vertical Z direction, and a much slower one in the X and Y directions. This design reduces the problems caused by the stylus sliding sideways around obstructions on a workpiece surface. In such a probe, although the symmetry of force versus stylus displacement is not achieved, the faster Z response can be used in combination with a fast-acting servo control system to minimise the earlier described problem. Alternatively, the diaphragms providing axial movement may be chosen so that their spring rate is relatively high, thus producing a probe in which the displacement characteristics are symmetrical.

Sensors other than optical sensors as described may be used provided that they can operate at sufficient speed. Thus for example, inductive, or capacitance sensors may be used to sense the X, Y or Z deflections. Also strain gauges may be positioned on the diaphragms or the stylus to determine the three components of the deflection of the stylus tip.

Where optical sensors are used the position-sensitive detector of FIGS. 1 to 4, or the split detector of FIGS. 5 and 6 may be replaced by a charge coupled device array and an interpolator, or other suitable photodetector.

We claim:

1. A measuring probe for use on a coordinate positioning apparatus, the probe comprising: a fixed structure by which the probe may be supported on a movable arm of the machine, and a stylus retaining member for retaining a workpiece-contacting stylus supported relative to the fixed structure by a suspension mechanism permitting at least two dimensional movement of the retaining member relative to the fixed structure, the probe further comprising transducer means for measuring displacement of the stylus retaining member in three perpendicular directions relative to the fixed structure, the transducer means comprising:

three light sources for generating three beams of light extending in three different directions;

three photodetectors retained on the fixed structure, each photodetector lying in register with one of the light beams;

a shutter coupled to the stylus retaining member for movement relative to the fixed structure which corresponds to movement of the stylus retaining member relative to the fixed structure, said shutter located in the path of each of said three light beams and including three apertures each of which permits the passage of a fraction of one of said light beams onto the surface of the corresponding photodetector;

each of said three photodetectors emitting at least one signal which is indicative of the displacement in a given direction of the position of incidence of said fraction of said respective light beam on said detector; wherein:

said three apertures are provided by three mutually perpendicular slits each of which a) extends in a direction transverse to said given direction and b) defines a direction of movement of said retaining member to which the corresponding photodetector is insensitive.

2. A measuring probe according to claim 1 wherein said shutter is mounted rigidly to said stylus retaining member.

3. A measuring probe according to claim 1 wherein each of said light sources is provided on the fixed structure.

4. A measuring probe according to claim 1 further comprising collimating means for collimating each of said light beams.

5. A measuring probe according to claim 1 wherein said shutter has an L-shaped cross-section.

6. A measuring probe according to claim 1 wherein each of said light sources and said photodetectors are provided in a transducer housing extending around said shutter, and wherein the position of the transducer housing is adjustable relative to the fixed structure to enable alignment of each aperture with the respective light beams.

7. A measuring probe according to claim 6 wherein said suspension mechanism enables tilting movements of said retaining member relative to the fixed structure.

8. A probe for use on a coordinate positioning apparatus, the probe comprising: a fixed structure by which the probe may be supported on a movable arm of the machine, and a stylus retaining member for retaining a workpiece-contacting stylus supported relative to the fixed structure by a suspension mechanism permitting at least two dimensional movement of the retaining member relative to the fixed structure, the probe further comprising a transducer assembly that measures displacement of the stylus retaining member relative to the fixed structure from a null position, the assembly comprising:

a light source for generating a beam of light;

a photodetector retained on the fixed structure and lying in register with the beam of light;

a shutter coupled to the stylus retaining member for movement relative to the fixed structure which corresponds to movement of the stylus retaining member relative to the fixed structure, said shutter being positioned between the light source and the photodetector, said shutter including an elongated slit aperture that permits the passage of a fraction of said light beam onto the surface of the photodetector, said elongated slit aperture extending in a first direction;

said photodetector emitting at least one signal that is indicative of displacement in a second direction transverse to said first direction of a position of incidence of said fraction of said light beam passing through said elongated slit onto said photodetector.

9. The probe according to claim 8, wherein said shutter is mounted rigidly to said stylus retaining member.

10. The probe according to claim 8, wherein said light source is provided on said fixed structure.

11. The probe according to claim 8, further comprising a lens that collimates said light beam.

12. The probe according to claim 8, wherein said light source and said photodetector are provided in a transducer housing extending around said shutter, and wherein the position of the transducer housing is adjustable relative to the fixed structure to enable alignment of the aperture with the light beam.

13. The probe according to claim 8, wherein said suspension mechanism enables tilting movement of said retaining member relative to the fixed structure.

* * * * *